Jan. 20, 1953  H. B. LAW  2,625,734
ART OF MAKING COLOR-KINESCOPES, ETC

Filed April 28, 1950  4 Sheets—Sheet 1

INVENTOR
Harold B. Law
BY Roderick Malcolm
ATTORNEY

Jan. 20, 1953     H. B. LAW     2,625,734
ART OF MAKING COLOR-KINESCOPES, ETC
Filed April 28, 1950     4 Sheets-Sheet 2

INVENTOR
Harold B. Law
BY Roderick Malcolm
ATTORNEY

INVENTOR
*Harold B. Law*
BY *Roderick Malcolm*
ATTORNEY

Jan. 20, 1953  H. B. LAW  2,625,734
ART OF MAKING COLOR-KINESCOPES, ETC
Filed April 28, 1950  4 Sheets—Sheet 4
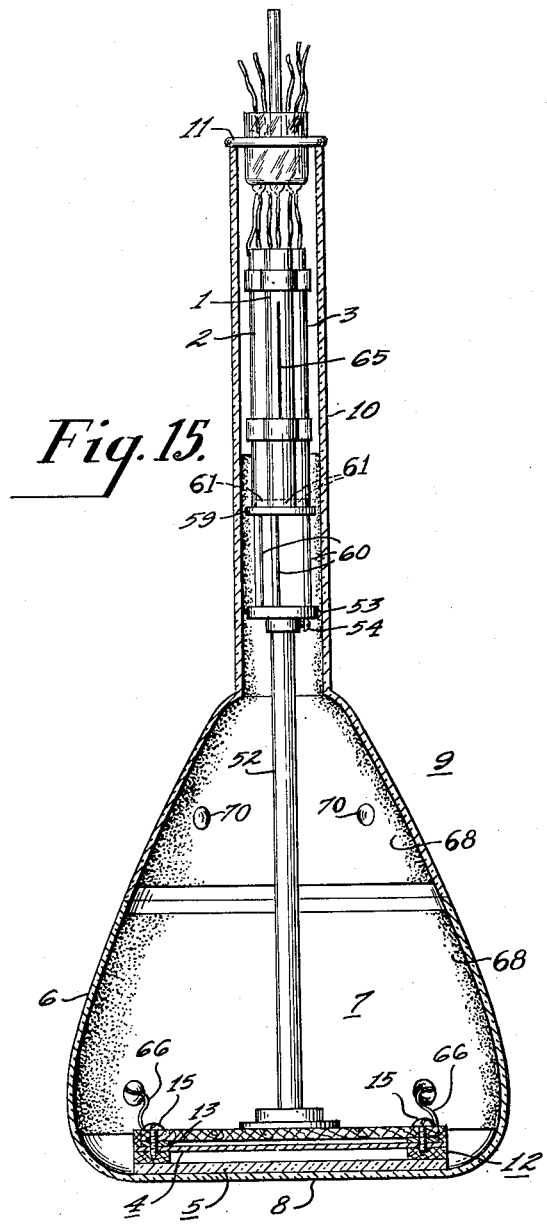
INVENTOR
*Harold B. Law*
BY *Roderick Malcolm*
ATTORNEY Patented Jan. 20, 1953

2,625,734

UNITED STATES PATENT OFFICE 2,625,734

ART OF MAKING COLOR-KINESCOPES, ETC.

Harold B. Law, Princeton, N. J., assignor to Radio Corporation of America, a corporation of Delaware Application April 28, 1950, Serial No. 158,901

3 Claims. (Cl. 29—25.13)

This invention relates to the art of manufacturing color-kinescopes and other cathode-ray tubes of the so-called "masked-target" variety.

Masked-target kinescopes are described in detail in Alfred N. Goldsmith's application Serial No. 548,239, filed August 5, 1944, which was refiled on July 19, 1947, as Serial No. 762,175, and in Alfred C. Schroeder's application Serial No. 730,637 filed February 24, 1947.

In kinescopes of the subject type, the electron-sensitive target comprises a multiplicity of groups of sub-elemental picture-areas. The sub-elemental areas of which the groups are comprised are each coated with a different phosphor material. Each phosphor material, when struck by electrons, emits light of a color component (usually, red, green or blue) individual to a given sub-elemental area. These phosphor areas may take the form of parallel lines or they may comprise a dot-like (i. e. "punctate") pattern. The masking electrode or "mask," which is disposed adjacent to the sensitized face of the target, contains apertures of the same shape and pattern as the phosphor areas. The number of apertures in the mask is less than the number of phosphor areas on the target. If a three-color target is employed the mask contains one-third as many apertures as there are phosphor areas on the target. The mask is scanned by one or more electron-beams.

If the kinescope is of the three-gun variety, the electron-guns are individual to the separate color-components of the phosphor covered areas of the target. The beams approach the mask at different angles. At the mask, the beam-paths cross and diverge to impinge upon separate ones of the sub-elemental areas in each phosphor group.

If the kinescope is of the one-gun variety, the beam is deviated and rotated to points corresponding to the points of origin of the three-gun beams, so that it too approaches the mask and target at angles individual to the different colors. The present invention is applicable to kinescopes of both the one-gun and three-gun varieties.

Color-kinescopes of the kind above described may be used in the receivers of most known types (e. g. dot-sequential, line-sequential or frame-sequential) of television systems. The polychromatic images produced on the screens of such kinescopes are commonly referred to as "additive-images." A "polychromatic additive-image" is an image that comprises a number (usually, three) of discrete monochromatic images of different colors. The differently colored images are presented to view separately (either in space or in space and time) in such a way that the separate images are added or blended, in the eyes of the observer, into a single, composite, polychromatic image.

The principal object of the present invention is to provide an improved method of and apparatus for manufacturing color-kinescopes of the general character described. The problems encountered in achieving this object, and the invention itself, are described in connection with the accompanying four sheets of drawings, wherein.

Figure 4:
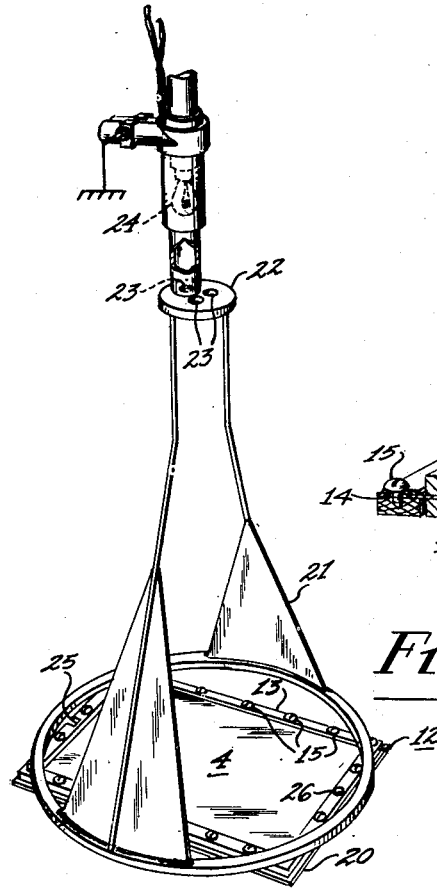
Fig. 4 is a view in perspective of a photographic apparatus used with the mask in plotting the dot-like pattern of sub-elemental phosphor areas on the target of Fig. 1.
Figure 5:
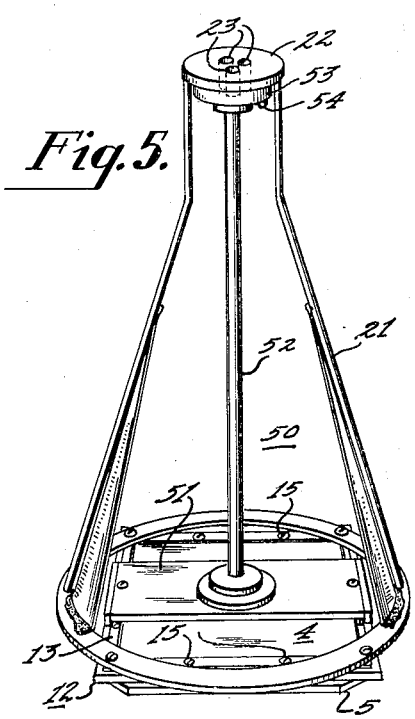
Fig. 5 is a view in perspective of a mask and target assembly in the process of being transferred from the pedestal or jig of Fig. 4 to a smaller jig, prior to entering the same into the frustum of the envelope shown in Fig. 2.
Figure 6:
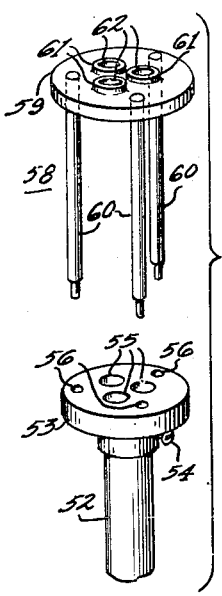
Fig. 6 is an exploded view showing an auxiliary jig designed to be superimposed on the end of the jig of Fig. 5 for the purpose of aligning the gun structure of Fig. 2 with the mask and target assembly.
Figure 10:
Figure 11:
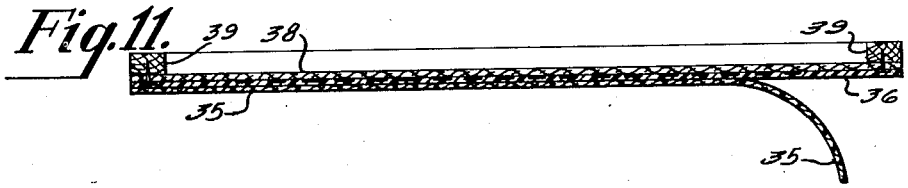
Figure 12:
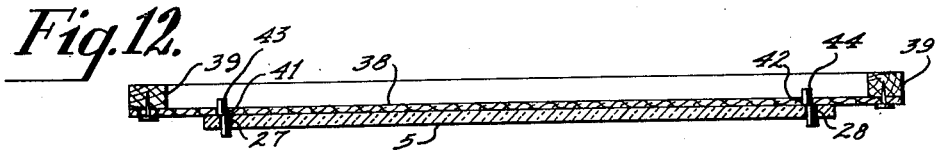
Figure 13:
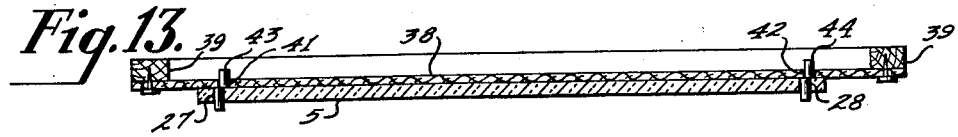
Figure 14:
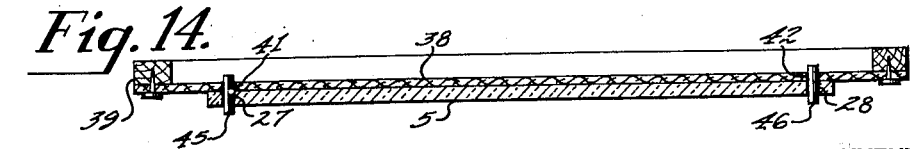

Figs. 10 and 11 comprise sectional views showing the pattern on the photographic plate of Fig. 4 being transferred to a cloth stencil for use in applying the phosphor materials to the target by an alternative ("silk-screen") method;

Figs. 12, 13 and 14 are sectional views showing a contrivance comprising eccentric and straight pins which may be employed to ensure correct positioning of the cloth-stencil on the target when applying the different phosphor materials to the target; and Fig. 15 is a view, partly in section, of the electron-gun assembly and the mask-and-target assembly supported on the jigs of Figs. 5 and 6 within the unsealed parts of the envelope of the kinescope during the final alignment of said parts.

Figure 1:
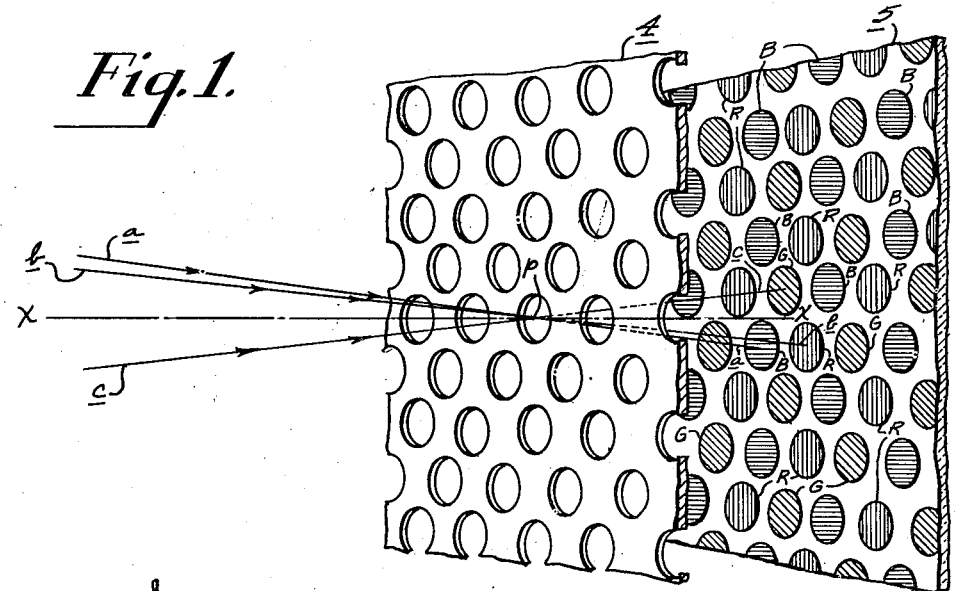
Fig. 1 is an enormously enlarged fragmentary view of a dot-like mask-and-target assembly of a color-kinescope, the drawing being marked with certain mechanical and electrical axes which will be referred to in explaining the operation of the kinescope and the problems with which the present invention is concerned.

The dot-like mask and color-target assembly shown in Fig. 1 has heretofore been used in color-kinescopes of both the "one-gun" and "three-gun" varieties. When the kinescope is of the latter variety the guns (which are designated 1, 2 and 3 in Figs. 2 and 15) are spaced 120° apart about the central axis $x$—$x$ of the tube and the axes, $a$—$a$, $b$—$b$, $c$—$c$, of said beams converge at a point $p$ in the plane of the foraminous mask 4.

When the kinescope is of the one-gun variety the beam from the single gun is magnetically rotated so that, in effect, it occupies, in time sequence, the three positions of the three beams in the three-gun kinescope. Thus when the single beam is in a position corresponding to the "green" beam of the three-gun kinescope it excites only the green phosphor dots (or lines) and is at this particular instant modulated only by the green component of the video signal. A short time later the beam has been rotated to a position corresponding to the "red" beam of the three-gun kinescope and is modulated by the red component of the video signal to excite the red phosphor dots. A third position is automatically provided by rotating the beam synchronously at the sampling frequency. In both the one-gun and three-gun kinescopes the angle of convergence of the beam (or beams) with the tube axis $x$—$x$ should preferably be as small as possible, e. g. less than 1°. Appropriate vernier deflecting forces applied to the beams during their scanning movements maintain the point $p$, at which the beams converge, in the plane of the mask throughout said scanning movements.

The mask 4 comprises a metal plate having an hexagonal array of holes, that is, each hole is surrounded by six equally spaced holes. The spacing and size of the holes in the mask, and the distance of the mask from the target 5, are so chosen that the electrons arriving at the screen, through the mask, from one beam (or beam position) do not overlap the electrons arriving from the other two beams (or beam positions). In the interest of good optical resolution the diameter of the holes and the spacing between holes are quite small. Thus, in one color-kinescope wherein the mask contained six-hundred horizontal and approximately four hundred and sixty vertical rows of holes, the diameter of the holes was 0.013″ and the distance between adjacent hole centers was 0.030″. The thickness dimension of the metal surrounding the holes should not be so great as to impede the passage of electrons therethrough and, preferably, should be substantially no greater than one-half the diameter of said holes; in this case about 0.0065″.

The dots on the rear face of the transparent foundation 5 of the target are formed of different phosphor materials. Each material emits light of a particular color component when struck by electrons. When, as in the instant case, the color components of the phosphor dots comprises red (R), blue (B) and green (G), the particular phosphor compounds of which the dots are formed may be the ones specified in Leverenz U. S. Patent 2,310,863.

There is a group of three phosphor dots for each hole in the mask. These dots are of the same size and of the same general (hexagonal) pattern of distribution as the holes in the mask. However, the phosphor dots are offset from the mask's holes so that each phosphor dot is accessible only to one (of the three) electron beam or beam positions. As described in greater detail in the previously identified patent applications of Goldsmith and Schroeder, color-images are built-up on the screen by modulating each beam with the appropriate video-color signal while causing the beams to trace a conventional scanning pattern on the back of the mask 4.

It will be apparent that during the scanning movement the electron-beam or beams are constantly changing their angle of approach to, and passage through, the holes in the mask. Hence, if a given beam is to impinge upon the phosphor dot of the color allotted to that beam (or beam-position) then the group of three dots which is individual to a particular hole must be offset from that hole by an amount that varies with the distance of that trio of dots from the center of the target. Thus each trio or group of dot-like phosphors bears a different spatial position with respect to its mask hole. While it is entirely possible mathematically to calculate the correct spacing and angular distribution of each group-of-three phosphor dots, this is a time-consuming operation (especially if the target comprises a curved surface) and one likely to be rendered ineffective: (a) By inaccuracies in the application of the various phosphors or (b) due to dimensional inaccuracies resulting from slack or lack of tautness in the mask or (c) inaccuracies in the orientation of the mask-and-target-assembly with respect to the electron-gun or battery of guns which serve the screen.

Accordingly, the present invention is concerned with and solves the following problems: (a) The construction of a taut, planar, foraminous mask. (b) The manufacture of a dot-like, tri-color, plane or curved phosphor target for use with said foraminous mask. (c) Mounting the mask and target into a unitary assembly with the parts oriented so accurately that an electron-beam or beams passing through the mask at angles which differ by 1° or less will strike discrete phosphor-areas individual to the different colors. (d) Mounting the mask and screen assembly within the main chamber of the kinescope in a position to be viewed through the window in said chamber. (e) Orienting the electron gun, or battery of guns, at the precise angle or angles required selectively to activate the discrete phosphor areas of the target. (f) Maintaining said orientation of the gun-to-target assembly while sealing and evacuating the kinescope.

Figure 2:
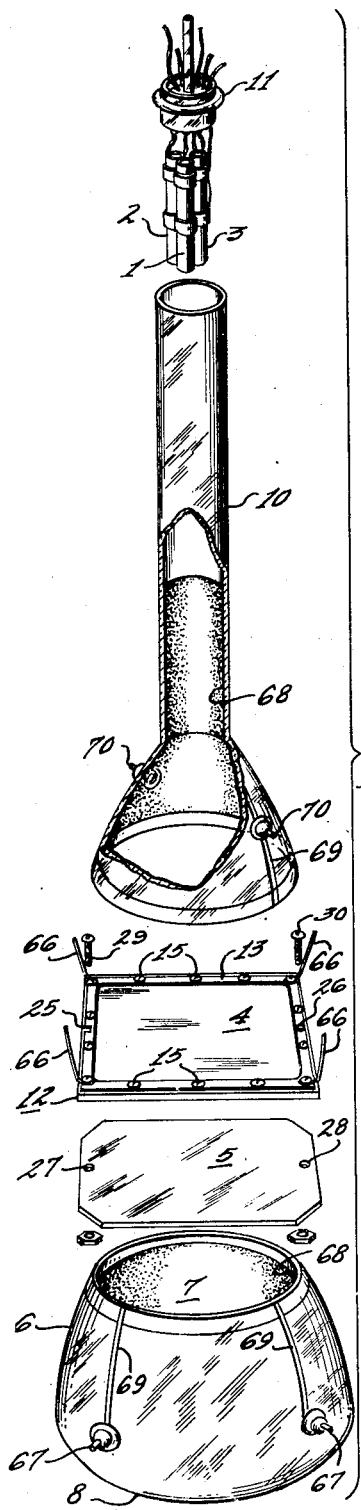
Fig. 2 is an exploded view showing the component parts of a three-gun color-kinescope prior to being assembled in the manner taught by the present invention.

The present invention is concerned in one way or another with all five of the component parts of the color-kinescope shown in Fig. 2. These parts comprise: (a) The frustum 6 containing the main chamber 7 and the window 8 of the envelope 9 (Fig. 15) of the kinescope. (b) The neck 10 of the envelope. (c) The closure element or collar 11 for the neck which serves as a support for the battery of electron-guns 1, 2 and 3. (d) The apertured metal mask 4 upon which the battery of electron-guns is to be trained. (e) The transparent foundation surface of the phosphor-dot target 5.

The foraminous mask

The apertured mask 4 through which the electrons travel in their transit to the target 5 may contain upwards of 100,000 holes. In one practical embodiment, wherein 117,000 holes were provided, the mask was made by a photoengraving and etching process. That is to say, a replica of a portion of the target was drawn, on an enlarged scale, in ink on paper (not shown) and then photographed. The photograph was reduced and duplicated to provide an entire pattern which was transferred, photographically, to a metal blank (not shown) coated with photosensitive material which hardens when exposed to light. The unhardened portions of the coating material were washed away and the areas of the metal, thus exposed, were etched through.

The thin metal mask 4 must be prevented from warping when subjected to normal operating temperatures. It the mask is permitted to warp or to bend, the electron-beams or beam paths can no longer cross "in the plane of the mask" and the masking effect is lost. In order to prevent warping, this thin metal sheet 4 is mounted upon a metal frame 12 in the manner shown in Fig. 3.

Figure 3:
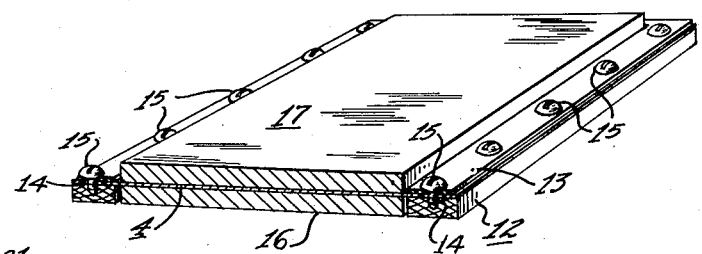
Fig. 3 is a fragmentary view in perspective showing the manner in which the apertured mask of Figs. 1 and 2 is stretched taut on its frame.

Referring to Fig. 3: It will be seen that the frame 12 is provided with a screw-actuated clamping plate 13 and that the marginal edges of the foraminous metal sheet 4 are provided with a number of oversize holes or elongated slots 14 through which the screws 15 of the clamping plate extend. The thin metal sheet 4 is placed between the frame 12 and the clamping plate 13 and the screws 15 are placed loosely in position thereon. The frame is then placed over a hot metal plate 16 and a similarly heated plate 17 is placed on or adjacent to the top surface of the thin metal sheet 4 to heat it to a temperature (say 100° C.) well above room temperature. The length and width dimensions of the hot plates 16 and 17 are smaller than the corresponding dimensions of the inside of the frame 12—13 so that the heating action is confined substantially to the sheet 4. Heating the metal sheet 4 by means of the hot plates 16 and 17 causes the sheet to expand, whereupon the screws 15 are tightened to clamp the sheet in its expanded condition, upon the frame 12. Upon cooling, the sheet contracts and is thus rendered taut.

The dot-like phosphor target

As previously set forth, the foundation surface of the transparent target 5 (Fig. 1) is provided with a group of three phosphor dots (R, B and G) for each one of the holes in the thin metal mask 4. Thus, in one successful embodiment of the invention wherein the mask was provided with 117,000 holes, the target was provided with 351,000 separate phosphor dots. In making such a target each group of three dots must be so oriented with respect to its mask hole that regardless of the position of that hole with respect to the central axis ($x$—$x$) of the kinescope each one of the said phosphor dots will be caused to lie in register with the axis ($a$—$a$ or $b$—$b$ or $c$—$c$) of the beam (or beam position) which is allotted to that dot's color.

The present invention utilizes photography in achieving the above described orientation of the phosphor dots. An apparatus which has successfully been employed in carrying out this feature of the invention is shown in Fig. 4. It comprises a photographic plate 20, upon which the framed mask 4 is placed and, upon the frame 12—13, a removable arbor or jig 21 that carries at the top a small disk 22 containing three holes 23 through any one of which light rays from a lamp 24 may be directed upon the mask 4 and photographic plate 20. A source of electrons (e. g. an electron gun, not shown) may be used in place of the lamp 24 provided the apparatus is first mounted within an evacuable chamber, not shown.

In this apparatus the distance between the mask 4 and the apertured disk 22 is the same as the distance between said mask and the "center-of-scan" of the finished kinescope. (The "center-of-scan" is the plane, or virtual plane, in which the axis of each deflected beam, when extended rearwardly, intersects the axis of origin of that beam.)

The distribution of the holes 23 in the disk 22 corresponds to the arrangement of the electron-guns to be used in the kinescope.

With the disk 22, mask 4 and photosensitive plate 20 arranged in the above described spaced relation, light-rays from the lamp 24 are passed through one of the holes 23 in the disk 22. These rays then pass through the holes in the mask 4 and produce upon the photosensitive plate 20 a pattern of dots which, when duplicated on the target of the tube, is accessible (through the mask) to an electron beam having the same center-of-scan and angle-of-approach as said light rays.

It should be noted that the number of dot-like areas marked on the photographic plate 20 by the light-rays passing through the mask is only one-third the number of sub-elemental phosphor areas with which the target 5 is to be provided. Thus, in plotting the distribution of the number of dots required to be applied to the surface of the glass target 5 it might appear necessary to expose the photographic plate 20 (or three different plates, not shown) to the action of light rays from each of the three apertures 23 in the disk 22. Such, however, is not necessarily the case. Excellent results have been achieved by employing a single exposure. In using a stencil made from a single exposure the different phosphors are laid down on the surface of the target by shifting the position of the stencil with respect to said surface prior to applying the second and third phosphors.

It will be observed upon close inspection of Figs. 2 and 4 that the frame 12—13 in which the mask 4 is held is provided on one of its ends with a slot 25 and on its other end with a circular hole 26. These distinctively shaped apertures extend through the mask 4. Hence the photographic plate 20 beneath the mask receives light from the lamp 24 and records the location of said apertures. The resulting marks are transferred to the stencil and may be used as reference points in shifting the stencil from one position to another on the target.

The apertures 25 and 26 in the frame and mask also have another function. Referring particularly to Fig. 2: The glass target 5 contains two holes 27 and 28 beneath the apertures 25 and 26 in the frame 12—13 of the mask 4. The target 5 is attached to the frame 12—13 by screws 29 and 30. In sealing and evacuating the envelope 9 the frame 12—13 and other metal parts are usually heated. The different coefficients of expansion of the metal and glass might cause the glass to crack were it not for the fact that the elongated slot 25, through which the pin 29 extends, permits a limited degree of lateral movement of the metal mask 4 on and with respect to glass target 5.

Figure 7:
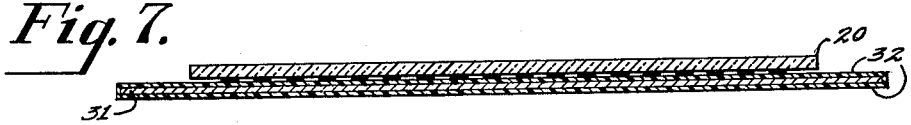
Figs. 7, 8 and 9 are a series of sectional views showing the manner in which the pattern on the photographic plate of Fig. 4 is transferred to a metal stencil-plate in converting the latter into a stencil for use in applying the different phosphor materials, by a "settling" process, to the foundation surface of the target.

The particular kind of stencil to be made from the photographic plate 20 depends upon the particular technique to be employed in laying down the phosphor dots (R, B and G) on the target 5. Thus, if the phosphor dots are to be laid down by "settling" the phosphor materials from a liquid suspension, the stencil preferably comprises an inflexible metal sheet 31 (Fig. 7). On the other hand, if the dots are to be applied by a "silkscreen" method, the stencil material should comprise silk or other fine cloth 38 (Fig. 11).

Figure 8:
Figure 9:
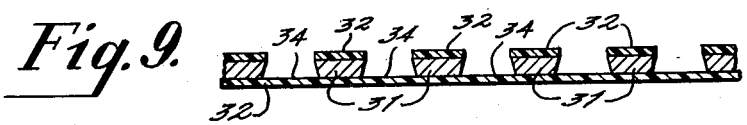

Referring to Fig. 7: If a metal stencil is to be employed in depositing the phosphor dots, an imperforate sheet of metal 31 is coated with a photosensitive acid-resisting gelatine or "enamel" 32, preferably on both sides. A contact print is made, on one of the coated surfaces, from the photographic negative 20. The other coated surface is completely exposed to harden its coating. Upon developing the enamel coating, the dot-like areas resulting from the exposure are removed, as shown at 33, Fig. 8, leaving the underlying metal areas exposed. The exposed surface areas of the metal are then subject to the action of a suitable acid and etched through, as shown at 34, Fig. 9. The acid-resisting coating 32 on the other face of the metal prevents the acid from spreading over that face. This coating and the coating of enamel remaining on the exposed areas of the obverse face are then removed and the stencil is ready for use in a conventional settling tank, not shown. In setting-up the metal stencil 31 in the settling tank the stencil is turned over and its treated face presented to the target. The phosphor pattern laid down on the target 5 during the settling operation is thus a true image, rather than a "mirror image" of the pattern on the photographic plate.

Referring to Figs. 10 and 11: If a cloth stencil (i. e. a "silk screen") is to be employed in applying the phosphor compounds to the target, the pattern on the photographic plate 20 is first transferred, photographically, through a transparent sheet 35 (Fig. 10) to a suitably sensitized film 36 on the surface of a backing sheet 37. Upon removing the plate 20 the paper backing 37 is removed from the sensitized film 36. The film is then placed on the bottom surface of the cloth screen 38. The cloth is considerably larger than the photographic plate 20 (Fig. 10). Hence when the photographic pattern on the film 36 is placed at the center of the supporting fabric or cloth 38, there is a marginal edge of cloth surrounding the pattern on the film. As indicated in Fig. 11, the cloth or fabric 38 is held taut on a wooden frame 39. The transparent sheet 35 is then removed and the film 36 developed, photographically. The development process removes the coating material underlying the dots and exposes a dot-like pattern of porous surface-areas in the cloth. The coating remaining between the dots of said pattern and on the marginal edges of the cloth is hardened when exposed to light and is rendered impervious to the comminuted crystalline phosphor particles (not shown) used in printing the dot-like pattern on the foundation surface of the target 5.

The three different phosphor materials to be applied to the glass foundation 5 of the target are made up in separate batches in the form of a paste capable of penetrating the porous surface areas of the cloth. The percentage of phosphor material in the different batches may differ as determined by the relative color-brilliance desired. The "green" phosphors usually exhibit more brilliant fluorescence than the others. It is therefore desirable to tone down this batch by the use of a larger percentage of binder or diluent.

In applying the phosphor paste to the glass foundation plate 5, the screen 38 is fixed on the surface of the plate and the paste forced through the porous areas of the fabric as with a roller or squeegee, not shown. When, as in the instant case, the differently colored phosphor dots are to be laid down in a triangular pattern, the arrangement of pins shown in Figs. 12, 13 and 14 may be employed to ensure correct positioning of the screen on the foundation plate during the separate application of said different phosphor materials.

The marginal enamel-covered portion of the screen 38 contains a pair of holes 41, 42 corresponding in position to the holes 27 and 28 in the glass plate 5. As shown in Figs. 12 and 13 adjacent pairs of the holes (i. e. holes 27—41, 28—42) each contain an eccentric pin, 43 and 44, respectively. Before applying one group of phosphor dots, the screen is swung to the left on said pins. Subsequently, as shown in Fig. 13, the screen is swung 120° to the right, and the second group of dots applied to the plate 5 through the fabric 38. Before applying the third group of dots the eccentric pins 43 and 44 are removed and a pair of straight pins 45—46 are substituted therefor, as shown in Fig. 14. The screen 38 should, of course, be thoroughly cleansed before using it in laying down the different phosphor materials.

An arrangement of eccentric and straight pins similar to that above described may be employed in positioning the metal stencil 31 (Fig. 9) when the separate phosphor materials are applied to the glass target from liquid suspensions, in a settling tank.

When the target 5 is completed it is mounted, in place of the photographic plate 20 (Fig. 4), on the back of the frame 12—13 in which the mask 4 is supported. The centering marks, photographically recorded (through the holes 25—26) on the target plate 5 are an aid in positioning the target 5 and its mask 4 on the frame 12—13. The screws or pins 29—30 (Fig. 2) are used for securing the target 5 to the frame 12—13. The attaching operation is preferably done while the pedestal or jig 21 (Figs. 4 and 5) is still fixed to the frame 12—13. Hence the correct position of the target 5 with respect to the center-of-scan may be tested by observing the pattern of light passing through the mask. If necessary the position of the target on the frame may be adjusted to bring the phosphor dots of a particular color into register with said pattern.

In mounting the mask and target assembly, and the electron gun or battery of guns 1, 2, 3, in the envelope 9 of the kinescope it is necessary to establish the correct spacing and orientation of the gun or guns with respect to said assembly, and with respect to the center-of-scan of the kinescope. The pedestal of jig 21 (Fig. 4) can not ordinarily be used for that purpose since its circular base is too large to permit its entry into the viewing chamber or frustrum 6 (Fig. 2) of the envelope. Accordingly, a second jig 50 (Figs. 5 and 6) having a base substantially no larger than the width of the frame is used.

Referring to Fig. 5: In transferring the frame-supported mask-and-target assembly 4—5 from the large jig 21 to the smaller jig 50 the base 51 of the latter is entered between the arms of the former and seated upon the upper surface of the frame 13. A pedestal or rod 52 at the center of the base 51 terminates in a short metal cylinder 53 which is moved into contact with the underside of the apertured disk 22 and secured to the rod 52 in that position by a set screw 54. The cylinder 53 contains two groups-of-three holes, 55 and 56 (see Fig. 6), respectively. The central group 55 correspond to the group of holes 23 in the disk 22 and are carefully aligned with the latter by manipulating the cylinder 53 when the set screw 54 is loose. The plane of the upper face of the cylinder 53 corresponds to the center-of-scan of the kinescope. (That is to say, the upper face of the cylinder 53 is the same distance from the mask 4 as that reference plane will be in the finished tube.)

Each one of the central group of three holes 55, in the cylinder 53 of the jig 50 marks the "point-of-scan" of one of the three electron-guns 1, 2 and 3 (Figs. 2 and 15). Hence said guns must be accurately spaced and aligned with respective ones of said apertures. The spacing and aligning operation is made practical by the use of an auxiliary jig 58 (Figs. 6 and 15) which is adapted to be fitted on top of the cylinder 53 of the second jig 50 when the first jig 21 (Figs. 4 and 5) is removed.

As shown in both Figs. 6 and 15 the auxiliary jig 58 comprises a disk 59 of a diameter small enough to be received within the neck 10 of the kinescope. The disk carries three dependent legs 60 which terminate in pins that fit into the outer group of holes 56 in the top of the other jig 50. With the upper jig 58 in position on the cylinder 53, the distance between the upper surface of that cylinder and the upper face of the disk 59 corresponds to the spacing between the nozzle-ends of the barrels of the electron-guns 1, 2 and 3 and the center-of-scan of the kinescope.

It will be observed upon inspection of Figs. 6 and 15 that the upper surface of the disk portion 59 of the auxiliary jig 58 is provided with three circular risers 61 surrounding respective ones of the central group of three holes 62 in said disk. These risers are dimensioned to fit within the ends of the barrels of the electron guns 1, 2 and 3, respectively. Thus, the auxiliary jig 58 serves not only to fix the spacing of the guns 1, 2, 3 with respect to the center-of-scan of the tube but serves also to determine their correct position about the central axis of the tube.

Since the jigs 50 and 58 must be removed from the envelope before sealing its parts 6, 10 and 11 together, it is necessary to record the correct orientation of said parts for use during the sealing operation. This is done simply by painting or otherwise marking a reference line 65 (Fig. 15) on one of the gun barrels when the guns are in the described position on the risers 61, and by placing another mark on the outer surface of the neck of the tube in register with the first mark. Thereafter, the collar 11 and neck 10 are removed from the frustum 6, and the stiff-wire leads 66 for the masking electrode 4 are welded to the inner ends of the terminals 67 (Fig. 2) on the frustum. With the mask and target assembly thus secured, the jigs 50 and 58 are removed and the neck 10 of the envelope fitted on the periphery of the frustum or main-chamber 6 and welded in place. Before welding the terminal piece or collar 11 on the end of the neck 10 the collar is rotated to bring the reference marks on the gun and neck into register with each other.

The conductive coatings (i. e. the "second anode") 68 on the inner surface of the neck 10 and main chamber 6 are next electrically connected, across the weld, by conductive stripes 69 which extend from the terminals 67 to the terminals 70 on the neck 10. The otherwise complete kinescope is now ready to be evacuated by conventional methods.

From the foregoing it should now be apparent that the present invention provides a highly accurate and trouble-free method of and apparatus for manufacturing cathode-ray tubes of the masked-target variety.

What is claimed is:

1. In the art of manufacturing cathode-ray color tubes of the kind having a center-of-scan and containing a color-screen unit comprising: (a) a taut thin-metal electrode having a multiplicity of systematically arranged dot-like apertures therein through which beam-electrons pass along different angularly related paths in their transit from said center-of-scan to (b) a screen-plate having a target surface made up of a multiplicity of systematically arranged groups of dot-like electron-sensitive target areas of different color-response characteristics and (c) a frame upon which said apertured electrode and said screen-plate are supported in spaced-apart relationship with the different dot-like target areas of each group located at the terminals of respectively different ones of said angularly related electron-paths; the method of making a screen-plate of the kind described and of mounting said screen plate on said frame in the proper location with respect to said apertured electrode to provide an operative color-screen unit irrespective of minor departures from a standard in the tensioning forces employed in securing said apertured electrode tautly on said frame; said method comprising: (1) placing a photographic plate adjacent to said frame in a plane spaced from said tautly mounted apertured electrode, (2) directing radiant energy through the dot-like apertures in said electrode from a point corresponding to a point at the center-of-scan of said cathode-ray tube, (3) taking a photograph on said photographic plate of the dot-like pattern resulting from the passage of said radiant energy through said apertures, (4) removing said photographic plate from its said position, (5) successively applying electron-sensitive materials of each color-response characteristic to said screen-plate in the dot-like pattern disclosed by said photographic plate and in accordance with said systematic group arrangement, and then (6) securing said sensitized screen-plate to said frame in the plane and position formerly occupied by said photographic plate.

2. In the art of manufacturing cathode-ray color tubes of the kind having a center-of-scan and containing a color-screen unit comprising: (a) a taut thin-metal electrode having a multiplicity of systematically arranged dot-like apertures therein through which beam-electrons pass along different angularly related paths in their transit from said center-of-scan to (b) a screen plate having a target surface made up of a multiplicity of systematically arranged groups of dot-like electron-sensitive target areas of different color-response characteristics and (c) a frame upon which said apertured electrode and said screen-plate are supported in spaced-apart relationship with the different dot-like target areas of each group located at the terminals of respectively different ones of said angularly related electron-paths; the method of making a screen-plate of the kind described and of mounting said screen plate on said frame in the proper location with respect to said apertured electrode to provide an operative color-screen unit irrespective of minor departures from a standard in the tensioning forces employed in securing said apertured electrode tautly on said frame; said method comprising: (1) placing said apertured electrode loosely on said frame, (2) heating said electrode to expand the thin metal of which it is comprised, (3) securing said expanded electrode to said frame and permitting it to contract upon cooling whereby to render it taut on said frame, (4) placing a photographic plate adjacent to said frame in a plane spaced from said tautly mounted apertured electrode, (5) directing radiant energy through the dot-like apertures in said electrode from a point corresponding to a point at the center-of-scan of said cathode-ray tube, (6) taking a photograph on said photographic plate of the dot-like pattern resulting from the passage of said radiant energy through said apertures, (7) removing said photographic plate from its said position, (8) successively applying electron-sensitive materials of each of said color-response characteristics to said screen-plate in the dot-like pattern disclosed by said photographic plate and in accordance with said systematic group arrangement, and then (9) securing said sensitized screen plate to said frame in the plane and position formerly occupied by said photographic plate.

3. In the art of manufacturing cathode-ray color tubes of the kind having a center-of-scan and containing a color-screen unit comprising: (a) a taut thin-metal electrode having a multiplicity of systematically arranged dot-like apertures therein through which beam-electrons pass along different angularly related paths in their transit from said center-of-scan to (b) a screen-plate having a target surface made up of a multiplicity of systematically arranged groups of dot-like electron-sensitive target areas of different color-response characteristics and (c) a frame upon which said apertured electrode and said screen-plate are supported in spaced-apart relationship with the different dot-like target areas of each group located at the terminals of respectively different ones of said angularly related electron-paths; the method of making a screen-plate of the kind described and of mounting said screen plate on said frame in the proper location with respect to said apertured electrode to provide an operative color-screen unit irrespective of minor departures from a standard in the tensioning forces employed in securing said apertured electrode tautly on said frame; said method comprising: (1) securing a photographic plate adjacent to said frame in a plane spaced from said tautly mounted apertured electrode, (2) directing radiant energy through the dot-like apertures in said electrode from a point corresponding to a point at the center-of-scan of said cathode-ray tube, (3) taking a photograph on said photographic plate of the dot-like pattern resulting from the passage of said radiant energy through said apertures, (4) removing said photographic plate from its said position, (5) successively applying electron-sensitive materials of each color-response characteristic to said screen-plate in the dot-like pattern disclosed by said photographic plate and in accordance with said systematic group arrangement, (6) placing said sensitized screen-plate loosely on said frame in place of said photographic plate, (7) again directing radiant energy through the dot-like apertures in said electrode from said point, (8) adjusting the position of said screen-plate to bring its pattern of phosphor dots into register with the dot-like pattern resulting from the passage of said radiant energy through said apertures, (9) securing said screen-plate, in its registered position, to said frame to provide a color-screen unit for use in a cathode-ray tube of the character described.

HAROLD B. LAW.

REFERENCES CITED

The following references are of record in the file of this patent:

UNITED STATES PATENTS

| Number | Name | Date |
|---|---|---|
| 1,848,802 | Piller | Mar. 8, 1932 |
| 2,500,877 | Sharples | Mar. 14, 1950 |
| 2,568,448 | Hansen | Sept. 18, 1951 |